US005752540A

United States Patent [19]

Hansel, Sr.

[11] Patent Number: 5,752,540

[45] Date of Patent: May 19, 1998

[54] DRAIN SOCK

[75] Inventor: Jeffrey Z. Hansel, Sr., Tampa, Fla.

[73] Assignee: Jeffrey Zane Hansel, Sr., Tampa, Fla.

[21] Appl. No.: 784,423

[22] Filed: Jan. 16, 1997

[51] Int. Cl.[6] .................................................... F16K 23/00

[52] U.S. Cl. ............................ 137/15; 137/312; 137/317; 137/328

[58] Field of Search ............................ 137/15, 312, 313, 137/317, 327, 328; 239/120, 121, 122

[56] References Cited

U.S. PATENT DOCUMENTS 5,344,193 9/1994 Rid ...................................... 137/312 X

*Primary Examiner*—Gerald A. Michalsky

[57] ABSTRACT

A device for removing sprinkler heads from the type of overhead sprinkler systems commonly found in commercial buildings. During use the device is clamped around the sprinkler pipe attached to a sprinkler head, and provides a means for containing the flow of pressurized or trapped water from the sprinkler head until a flexible hose, such as a garden hose, can be connected to its hose bib and extended to a friendly location for efficient and damage-free removal of water from the sprinkler head during to its disconnection from the sprinkler system. The device comprises a hose member able to withstand without rupture minimum water pressures of 175 psi or greater, two bushings for sealing the open ends of the hose member, a hose bib communicating with the interior of the hose member, a plurality of clamps to securely connect the hose member to the upper and lower bushings so as to provide watertight connections, and an extension piece extending from the interior of the hose member below the hose bib for use in remote removal of a sprinkler head positioned within the interior of the hose member. Applications may include, but are not limited to, use in removing sprinkler heads from overhead sprinkler systems in commercial buildings during routine maintenance, renovation, and repair work.

6 Claims, 3 Drawing Sheets

DRAIN SOCK

BACKGROUND

1. Field of Invention

This invention relates to plumbing tools, specifically to a device for removing sprinkler heads from the type of overhead sprinkler systems commonly found in commercial buildings, the device being clamped around a sprinkler pipe during use so that its hose member encases the sprinkler head attached to the pipe to provide a means for containing pressurized flow of water from the sprinkler head until a flexible hose, such as a garden hose, can be connected to its hose bib and extended to a friendly location for the efficient and damage-free draining of water from the sprinkler head during to its removal. Applications may include, but are not limited to, use in disconnecting sprinkler heads from overhead sprinkler systems in commercial buildings during routine maintenance, renovation, and repair work.

2. Description of Prior Art

Sprinkler heads in the overhead sprinkler systems in commercial buildings require periodic maintenance and repair. Problems encountered in disconnecting such sprinkler heads during such maintenance or repair involve built-up pressure in the sprinkler system which causes water to drain from a sprinkler head during its removal. Prior to removing a sprinkler head it is impossible to predict the amount of water trapped in a sprinkler system and ready to flow into the area below it. Also, some buildings have multiple systems which make it difficult to determine where one system ends and another begins. As a result, occasionally a wrong valve is turned off and full water pressure remains in the line connected to the sprinkler head contemplated for removal. A bucket placed beneath a sprinkler head contemplated for removal would adequately trap a small amount of water remaining in the attached sprinkler system lines. However, when the wrong valve is turned off and full water pressure, or a large volume of trapped water, is present at the sprinkler head connection, use of a bucket thereunder would be inadequate to prevent water damage to surrounding office equipment, carpeting, wood paneling, stored inventory, and the like.

The invention thought to be most closely related to the present invention is the sprinkler head water damage control device disclosed in U.S. Pat. No. 5,344,193 to Rio (1994). The Rio invention comprises a cup-shaped collector attached to the upper end of a telescoping pole. The collector is sufficiently sized to contain at least a portion of an open sprinkler head and water discharged therefrom. An elongated hose communicates with the collector and drains off water entering the collector. It is contemplated for the Rio invention to be placed under a sprinkler head to collect and safely drain discharged water away from it, however, it is not clamped to any portion of a sprinkler head or the sprinkler system pipe to which the sprinkler head is connected. Also, the Rio invention does not comprise means for use in unscrewing and removing a sprinkler head from the reducing coupling which connects it to one of the sprinkler system pipes. Therefore, the Rio invention has limited use for maintenance purposes, and is mainly useful during fires when the sprinkler heads are activated. In contrast, the present invention clamps tightly around a sprinkler head so that its hose member can retain pressurized or trapped water flowing from the sprinkler head, until such time as a hose, such as a garden hose, can be attached to its hose bib, extended to a friendly location, and the hose bib opened to safely remove the trapped or pressurized water from the sprinkler head. In addition, the extension piece of the present invention can be used to unscrew and remove a sprinkler head from a reducing coupling used to connect it to a sprinkler system. During use of the Rio invention, when an incorrect water valve is shut off, one person would be required to hold the Rio invention under the sprinkler head to collect the pressurized water flowing from the sprinkler pipe attached to the sprinkler head, while another person attempted to locate the correct shut-off valve. However, in using the present invention only one person is required to perform the same functions. One person can clamp the hose member around the sprinkler pipe so that any water flowing from the sprinkler head connected thereto is automatically contained within the hose member until drained through its hose bib into a friendly location. That same person can leave the present invention attached around the sprinkler head while he or she attempts to find a shut-off valve. Since the hose member of the present invention is made from materials sufficient to contain water at pressures of 175 psi or greater, 175 psi being the water pressure generally found in water sprinkler systems, no water entering the hose member of the present invention will escape from it to damage equipment and building structures. It is not known to have a drain sock for use in removing a sprinkler head from the type of sprinkler system typically used in commercial buildings, collecting and retaining water drained from the sprinkler head during such removal, and which is clamped securely around the sprinkler head during its disconnection from the sprinkler system to temporarily contain pressurized or trapped water flowing from the sprinkler head until a flexible hose can be attached to its hose bib and extended to a friendly location for the efficient and damage-free drainage of such water.

SUMMARY OF INVENTION

Objects and Advantages

It is the primary object of this invention to provide a drain sock for the efficient removal of sprinkler heads from the type of overhead sprinkler systems commonly found in commercial buildings and the damage-free draining of pressurized or trapped water from the water line connected to the sprinkler heads during their disconnection. It is also an object of this invention to provide a drain sock for the removal of sprinkler heads which has a hose member sufficiently strong to contain without rupture the pressurized water in the water line connected to the sprinkler head until the correct shut-off valve for the sprinkler head can be located if an incorrect water valve was initially turned off. A further object of this invention is to provide a drain sock for the removal of sprinkler heads which is compact, relatively inexpensive, and easy to use. It is also an object of this invention to provide a drain sock for the removal of sprinkler heads which accommodates situations involving both small amounts of trapped water as well as situations in which the incorrect water valve has been initially turned off leaving full water pressure in the water line connected to the sprinkler head contemplated for removal.

As described herein, properly manufactured and used to remove a sprinkler head from the type of overhead sprinkler system used in commercial buildings, the present invention would provide an easy-to-use, damage-free means for containing trapped or pressurized water flowing from the water lines of the sprinkler system during disconnection of an attached sprinkler head and for efficiently draining such water into a friendly location. The present invention comprises a hose member made of materials able to withstand without rupture water pressures of at least 175 pounds per square inch or greater, a hose bib communicating with the interior of the hose member, and a plurality of clamps for securely fastening the hose member around a sprinkler head to provide the present invention with an ability to contain the pressurized or trapped water flowing from the sprinkler head until the operator is ready to release it through the connected hose bib. For evacuation of water from the hose member, it is contemplated for a sufficient length of common garden hose to be connected to the hose bib of the present invention and extended to a friendly location for release and disposal of the water flowing from a sprinkler head as it is disconnected from a sprinkler system water pipe. A lower bushing, preferably made from polyvinyl chloride or metal, is connected to the lower end of the hose member by sufficient clamping means to provide a watertight seal. An extension piece having a socket adapter attached thereto extends through the lower bushing and into the interior of the hose member for use in the remote removal of a sprinkler head positioned within the hose member. An upper bushing, preferably made from rubber, is placed around the sprinkler pipe, just above the reducing coupling of the sprinkler pipe, and connected to the upper end of the hose member by sufficient clamping means to provide a watertight seal. After an appropriately sized socket head is attached to the socket adapter on the upper end of the extension piece and engaged around the sprinkler head for rotation, the hose member is slid upwardly over the sprinkler head, clamps around the outside of the hose member are aligned with the slots in the upper bushing, and the hose member is securely attached to the upper bushing by tightening the clamps to provide a watertight seal. With the hose bib in a closed position, the extension piece is used to unscrew the sprinkler head from its attached sprinkler pipe. When water no longer drains from the sprinkler pipe, the clamps, the hose member, and the upper bushing can be removed from around the sprinkler head and the sprinkler pipe formerly connected thereto.

The description herein provides preferred embodiments of the present invention but should not be construed as limiting the scope of the drain sock invention. For example, variations in the length of the extension piece, the type of clamps used, the type of material used for the lower bushing, the type of watertight seal used around the entry of the extension piece through the lower bushing, the depth of the upper and lower bushings, the dimension and configuration of hose bib used, and the length of the hose member, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 4 is a side view of the invention as it is moved vertically upward over a sprinkler head for attachment to the sprinkler pipe connected to the sprinkler head.

DETAILED DESCRIPTION OF PREFERRED EMBODIMENTS

Figure 1:
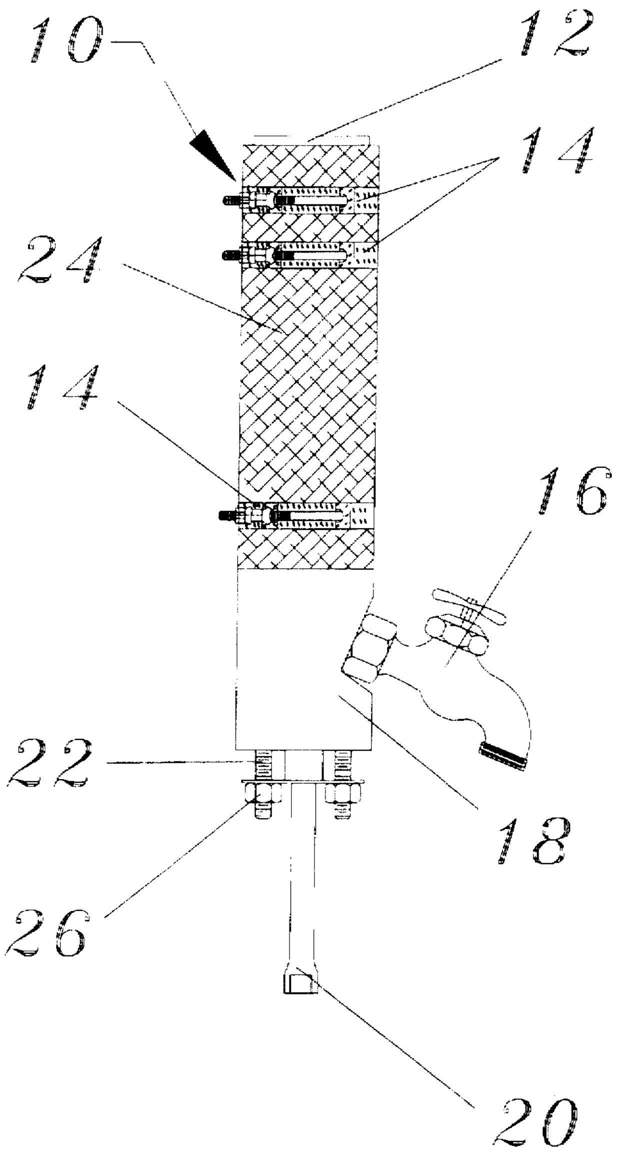
FIG. 1 is a side view of the invention.

FIG. 1 shows a preferred embodiment of a drain sock invention 10 having a hose member 24 connected to a lower bushing 18 by use of a clamp 14. The length of hose member 24 is not critical to the present invention. FIG. 1 also shows a hose bib 16 connected through one side of lower bushing 18, two clamps securing the upper end of hose member 24 to an upper bushing 12, and a packing gland 22 providing a leakproof seal around the entry point of an extension piece 20 through the bottom of lower bushing 18. The configuration and dimension of hose bib 16 is not critical to drain sock invention 10. However, in the preferred embodiment hose member 24 must be made from materials able to contain water pressures of at least 175 psi, the pressure routinely found in commercial sprinkler system pipes. As a result, in the preferred embodiment it is contemplated for hose member 24 to be made from marine hose or fire hose. Although three worm screw clamps 14 are shown in FIG. 1, the number and type of clamps 14 used are not critical to drain sock invention 10. It is also contemplated to have stainless steel clamps 14 with locking screws connected thereto. Also, although not critical, in the preferred embodiment it is contemplated for upper rubber bushing 12 to have a density measurement of 105 durometers and to be made from NEOPRENE®. Further, in the preferred embodiment it is contemplated for lower bushing 18 to be made from polyvinyl chloride or metal, and for packing gland 22 to comprise a plurality of internally threaded nuts 26 and graphite-laden or wax-laden string, or rubber gaskets.

Figure 2:
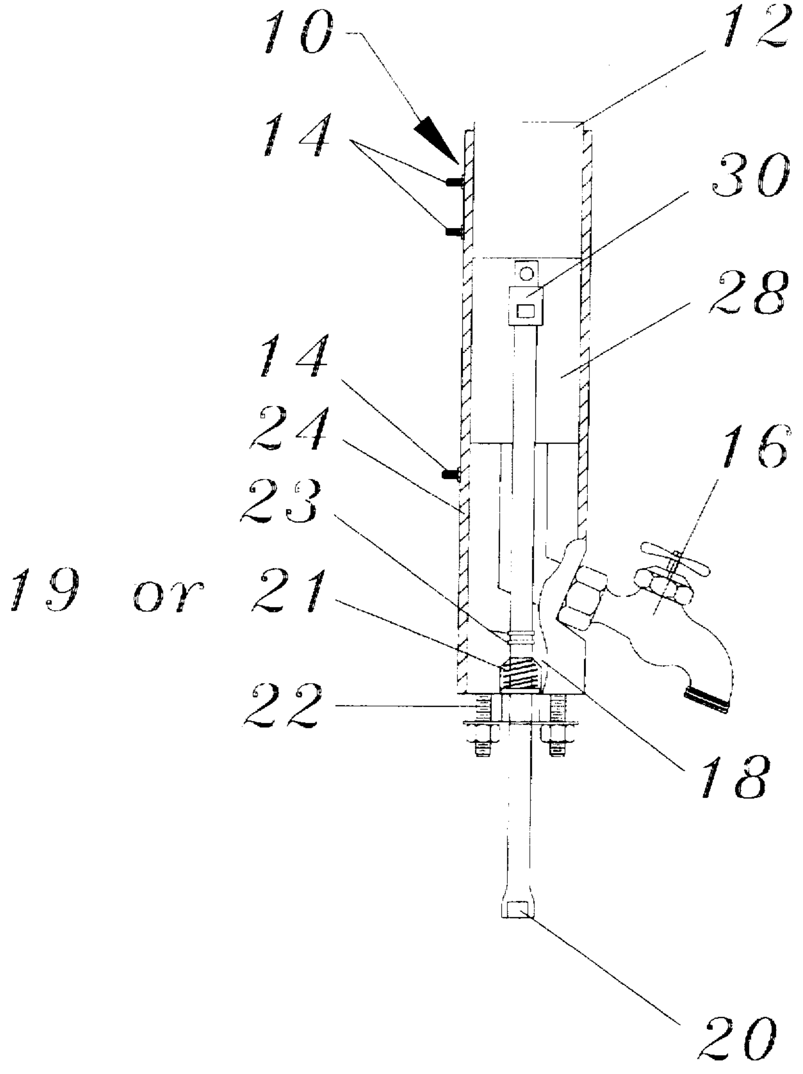
FIG. 2 is a sectional side view of the invention.
Figure 1:
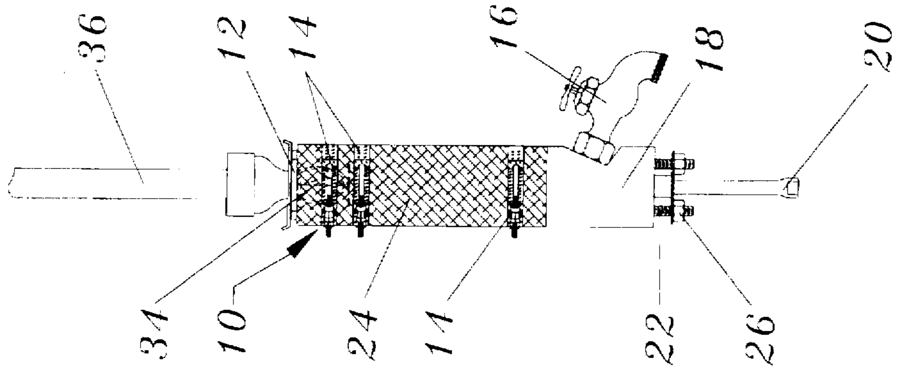

FIG. 2 shows drain sock invention 10 having hose member 24 connected to lower bushing 18 by use of one clamp 14, hose member 24 having an interior opening 28 therein, hose bib 16 connected through one side of lower bushing 18 so as to communicate with interior opening 28, two clamps 14 securing the upper end of hose member 24 to upper bushing 12, and packing gland 22 positioned around extension piece 20 so as to seal the entry of extension piece 20 through the bottom of lower bushing 18. FIG. 2 also shows the upper end of extension piece 20 having a socket adapter 30 connected thereto. In the preferred embodiment it is also contemplated for the lower end of extension piece 20 to be configured for connection thereto of a three-eighths inch ratchet extension. The length or diameter of extension piece 20 is not critical to drain sock invention 10.

Figure 3:
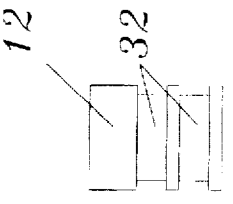
FIG. 3 is a side view of the upper bushing having grooves therein.

FIG. 3 shows the sides of upper bushing 12 having grooves 32 therein for alignment therewith and connection therearound of clamps 14 to provide a more secure connection of hose member 24 to upper bushing 12. Although the number of grooves 32 in upper bushing 12 is not critical, FIG. 3 shows two grooves 32 therein. Also, although not critical, in the preferred embodiment it is contemplated for hose bib 16 to have threads on its distal end for connection thereto of a garden hose with a three-fourths inch connector, for socket adapter 30 on the upper end of extension piece 20 to be three-eighths of an inch by one-half an inch, for lower bushing 18 to be two inches in depth and have a three-fourths inch opening therethrough for insertion therethrough of extension piece 20, for upper bushing 12 to be two inches in depth and have an outside diameter of two-and-three-eighths inches and an inside diameter of one-and-three-eighths inches, for hose member 24 to have an inside diameter of two-and-one-half inches, and for extension piece 20 to be approximately seventeen inches in length and have a cross-sectional dimension of approximately three-eighths of an inch.

FIG. 4 shows drain sock invention 10 having hose member 24 connected to lower bushing 18 by use of one clamp 14, hose bib 16 connected through one side of lower bushing 18, two clamps 14 securing the upper end of hose member 24 to upper bushing 12, and packing gland 22 comprising internally threaded nuts 26 and positioned around extension piece 20 so as to seal the entry of extension piece 20 through the bottom of lower bushing 18. FIG. 4 also shows a sprinkler head 34 attached to a sprinkler system pipe 36 and sprinkler head 34 downwardly inserted into the upper end of hose member 24.

To use drain sock invention 10, one would upwardly move hose member 24 and upper bushing 12 over sprinkler head 34 and position upper bushing 12 around sprinkler system pipe 36. Should there be a reducing coupling connecting sprinkler head 34 to sprinkler system pipe 36, upper bushing 12 would be positioned around sprinkler system pipe 36, just above the reducing coupling. A user would then attach an appropriately sized head socket 30 to the upper end of extension piece 20, place head socket 30 against sprinkler head 34 to rotationally engage it, slide hose member 24 upwardly and over sprinkler head 34 until clamps 14 positioned around hose member 24 are aligned with grooves 32 on upper bushing 12. The user would then tighten clamps 14 to ensure a watertight connection of hose member 24 around sprinkler pipe 36. Thereafter, making certain that hose bib 16 is in a closed position, the user would connect a ratchet (not shown) to the lower end of extension piece 20 and unscrew sprinkler head 34. One end of a common garden hose (not shown) would then be connected by the user to hose bib 16 and the other end of the garden hose extended to a friendly location (not shown) for the damage-free disposal of trapped or pressurized water released from sprinkler pipe 36 as sprinkler head 34 is disconnected therefrom. When water drainage through the garden hose has stopped, the user can safely unfasten clamps 14, remove hose member 24 from upper bushing 12, and remove upper bushing 12 from around sprinkler pipe 36 without subjecting the area and equipment below sprinkler head 34 to a risk of water damage.

What is claimed is:

1. A device for removing a sprinkler head from the type of overhead sprinkler system commonly used in commercial buildings and for damage-free removal of pressurized and trapped water from the water lines in such a sprinkler system as said sprinkler head is disconnected therefrom, said device comprising a hose member having a hollow interior, an upper portion, and a lower portion, said hose member being made from material having sufficient strength to contain water under pressure of a minimum of 175 psi; an upper bushing; a lower bushing; a plurality of clamps to secure said upper bushing within said upper portion of said hose member and to secure said lower bushing within said lower portion of said hose member; a hose bib connected through said lower bushing so as to communicate with said hollow interior of said hose member; an extension piece connected through said lower bushing, said extension piece having a upper end and a lower end, said upper end being positioned within said hollow interior and said lower end extending below said lower bushing during use; and watertight sealing means to seal said extension piece within said lower bushing so that as a user rotates said lower end of said extension piece, said upper end of said extension piece can engage for rotation a sprinkler head positioned within said hollow interior of said hose member and as said sprinkler head is rotated for disconnection from a sprinkler pipe connected to said sprinkler head pressurized and trapped water in said sprinkler pipe will be contained within said hollow interior of said hose member until removed from said hollow interior through said hose bib.

2. The device of claim 1 wherein said upper bushing further comprises sides and grooves in said sides for a more secure attachment of said hose member to said upper bushing by said clamps.

3. The device of claim 1 wherein said sealing means comprises a packing gland comprising a quantity of graphite-laden string and a plurality of internally threaded nuts.

4. The device of claim I wherein said sealing means comprises a packing gland comprising a quantity of wax-laden string and a plurality of internally threaded nuts.

5. The device of claim 1 wherein said sealing means comprises a plurality of rubber gaskets.

6. A method for removing a sprinkler head from the type of overhead sprinkler system commonly used in commercial buildings and for damage-free removal of pressurized and trapped water in said sprinkler system as said sprinkler head is disconnected, said method comprising the steps of providing a hose member, an upper bushing, a lower bushing, a plurality of clamps, an extension piece, a hose bib, a head socket, a ratchet, a garden hose, and sealing means; placing said upper bushing around a sprinkler pipe to which a sprinkler head is connected; attaching said head socket to the upper end of said extension piece; placing said head socket against said sprinkler head to engage it for rotation; positioning said clamps around the upper end of said hose member; sliding said hose member up and over said sprinkler head until said clamps are aligned with grooves on said upper bushing; tightening said clamps around said hose member and said upper bushing; placing said hose bib into a closed position; connecting a ratchet to the lower end of said extension piece; using said ratchet to rotate said extension piece and thereby unscrew said sprinkler head; attaching said one end of said garden hose to said hose bib; extending the other end of said garden hose to a friendly location for the damage-free disposal of pressurized and trapped water released from said sprinkler system as said sprinkler head is disconnected therefrom; opening said hose bib; allowing said pressurized and trapped water to drain from said garden hose into said friendly location; when water drainage through said garden hose has stopped, unfastening said clamps from around said upper end of said hose member; removing said hose member from said upper bushing; and removing said upper bushing from around said sprinkler pipe.

* * * * *